(12) United States Patent
Cox et al.

(10) Patent No.: US 11,526,404 B2
(45) Date of Patent: Dec. 13, 2022

(54) EXPLOITING OBJECT TAGS TO PRODUCE A WORK ORDER ACROSS BACKUP ENGINES FOR A BACKUP JOB

(71) Applicant: International Business Machines Corporation, Armonk, NY (US)

(72) Inventors: Sean P. Cox, San Francisco, CA (US); David G. Derk, Gibsonia, PA (US); Kevin L. Gibble, Tucson, AZ (US); Avishai H. Hochberg, San Jose, CA (US); James P. Smith, Redwood City, CA (US); Steven V. Voyk, Austin, TX (US); Martine B. Wedlake, Hillsboro, OR (US); Jean X. Yu, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 698 days.

(21) Appl. No.: 15/473,450

(22) Filed: Mar. 29, 2017

(65) Prior Publication Data
US 2018/0285203 A1  Oct. 4, 2018

(51) Int. Cl.
G06F 11/14 (2006.01)

(52) U.S. Cl.
CPC ...... *G06F 11/1464* (2013.01); *G06F 11/1461* (2013.01); *G06F 2201/815* (2013.01)

(58) Field of Classification Search
CPC .......... G06F 11/1464; G06F 11/1461
USPC ........................................... 707/654
See application file for complete search history.

(56) References Cited

U.S. PATENT DOCUMENTS

| | | | | |
|---|---|---|---|---|
| 7,917,617 B1* | 3/2011 | Ponnapur | ............ | G06F 9/45558 709/224 |
| 8,290,912 B1* | 10/2012 | Searls | ................ | G06F 11/1453 707/831 |
| 8,719,286 B1* | 5/2014 | Xing | .................... | G06F 11/1451 707/755 |
| 8,996,490 B1* | 3/2015 | Armangau | ............. | G06Q 30/02 707/705 |
| 9,128,627 B1* | 9/2015 | Bachu | ................. | G06F 11/1456 |
| 9,158,653 B2* | 10/2015 | Gold | .................... | G06F 11/3457 |
| 9,292,327 B1* | 3/2016 | von Thenen | ........ | G06F 11/1484 |
| 9,460,098 B2 | 10/2016 | Zhang et al. | | |
| 9,479,585 B1* | 10/2016 | Jobanputra | ........... | G06F 16/188 |
| 9,628,561 B1* | 4/2017 | Kulkarni | ............. | G06F 11/1464 |
| 9,740,577 B1* | 8/2017 | Chakraborty | ....... | G06F 11/1464 |

(Continued)

OTHER PUBLICATIONS

IBM, "IBM Tivoli Storage Manager For Windows Backup-Archive Clients Version 7.1.6—Installation and User's Guide", Jun. 2016, 838 pages (Year: 2016).*

(Continued)

*Primary Examiner* — Tony Mahmoudi
*Assistant Examiner* — Michael Le
(74) *Attorney, Agent, or Firm* — Konrad Raynes Davda & Victor LLP; Janaki K. Davda

(57) ABSTRACT

Provided are techniques for exploiting object tags in order to produce a work order across several backup engines for a backup job. A selection of tags for an object is received. A work order for the object is created using the tags. The work order is stored with a virtual server that stores the object, wherein a data mover of a backup engine retrieves the work order from the virtual server to back up the object.

20 Claims, 12 Drawing Sheets

(56) References Cited

U.S. PATENT DOCUMENTS

| | | | | |
|---|---|---|---|---|
| 9,753,810 | B1* | 9/2017 | Khandelwal | G06F 11/1464 |
| 2003/0196052 | A1* | 10/2003 | Bolik | G06F 11/1448 |
| | | | | 711/162 |
| 2003/0225801 | A1* | 12/2003 | Devarakonda | G06F 16/221 |
| 2004/0204949 | A1* | 10/2004 | Shaji | G06F 11/1415 |
| | | | | 717/174 |
| 2007/0220311 | A1* | 9/2007 | Lewin | G06F 11/1471 |
| | | | | 714/6.32 |
| 2007/0271428 | A1* | 11/2007 | Atluri | G06F 11/1451 |
| | | | | 711/162 |
| 2010/0011178 | A1* | 1/2010 | Feathergill | G06F 11/1466 |
| | | | | 711/E12.103 |
| 2010/0162039 | A1* | 6/2010 | Goroff | G06F 11/1451 |
| | | | | 714/6.12 |
| 2011/0191559 | A1* | 8/2011 | Li | G06F 12/16 |
| | | | | 711/162 |
| 2011/0276539 | A1* | 11/2011 | Thiam | G06F 11/2058 |
| | | | | 707/634 |
| 2012/0191658 | A1* | 7/2012 | Ambat | G06F 21/6209 |
| | | | | 707/654 |
| 2013/0173780 | A1* | 7/2013 | Ditto | G06F 11/1484 |
| | | | | 709/224 |
| 2013/0275376 | A1* | 10/2013 | Hudlow | G07F 17/3241 |
| | | | | 707/639 |
| 2013/0339643 | A1* | 12/2013 | Tekade | G06F 16/275 |
| | | | | 711/162 |
| 2014/0181038 | A1* | 6/2014 | Pawar | G06F 16/13 |
| | | | | 707/650 |
| 2014/0196038 | A1* | 7/2014 | Kottomtharayil | G06F 9/45533 |
| | | | | 718/1 |
| 2014/0196056 | A1* | 7/2014 | Kottomtharayil | G06F 9/5083 |
| | | | | 718/105 |
| 2015/0074362 | A1* | 3/2015 | Mohl | G06F 3/0673 |
| | | | | 711/162 |
| 2015/0106334 | A1* | 4/2015 | Lee | G06F 11/1466 |
| | | | | 707/639 |
| 2015/0143064 | A1* | 5/2015 | Bhargava | G06F 11/1451 |
| | | | | 711/162 |
| 2015/0236916 | A1* | 8/2015 | Spurlock | H04L 41/0856 |
| | | | | 709/203 |
| 2015/0350103 | A1* | 12/2015 | Bertram | H04L 47/70 |
| | | | | 709/226 |
| 2016/0048408 | A1* | 2/2016 | Madhu | G06F 11/2023 |
| | | | | 718/1 |
| 2016/0142485 | A1* | 5/2016 | Mitkar | G06F 16/128 |
| | | | | 707/681 |
| 2016/0259919 | A1* | 9/2016 | Haruna | G06F 21/6209 |
| 2016/0306642 | A1* | 10/2016 | Kottomtharayil | G06F 9/45533 |
| 2016/0371153 | A1* | 12/2016 | Dornemann | G06F 9/45558 |
| 2016/0373291 | A1* | 12/2016 | Dornemann | H04L 41/042 |
| 2017/0185490 | A1* | 6/2017 | Sridharan | G06F 11/1464 |
| 2017/0230419 | A1* | 8/2017 | Prafullchandra | H04L 63/20 |
| 2017/0300386 | A1* | 10/2017 | Shulga | G06F 11/1469 |
| 2018/0145970 | A1* | 5/2018 | Agrawal | H04L 63/105 |
| 2019/0179717 | A1* | 6/2019 | Juniwal | G06F 11/1484 |

OTHER PUBLICATIONS

IBM, "IBM Spectrum Protect for Windows Backup-Archive Clients Version 8.1.0", Dec. 2016 (Year: 2016).*

IBM, "IBM Spectrum Protect Version 8.1.0—Optimizing Performance", Nov. 20, 2016 (based on PDF document properties), 274 pages printed. (Year: 2016).*

IBM, "IBM Spectrum Protect for Virtual Environments Version 8.1.0—Data Protection for VMware User's Guide", Feb. 20, 2017 (based on PDF document properties but could be earlier based on software version), 252 pages printed. (Year: 2017).*

Mell et al., "Effectively and Securely Using the Cloud Computing Paradigm" dated Oct. 7, 2009, NIST, Information Technology Laboratory, Total 80 pages.

Mell et al., "The NIST Definition of Cloud Computing" dated Sep. 2011, Computer Security Division Information Technology Laboratory, Recommendations of the National Institute of Standards and Technology, Total 7 pages.

[Part 1 of 3] Grace Period Disclosure: IBM, "IBM Spectrum Protect for Windows Backup-Archive Clients Version 8.1.0—Installation and User's Guide", (Dec. 2016), 272 pages.

[Part 2 of 3] Grace Period Disclosure: IBM, "IBM Spectrum Protect for Windows Backup-Archive Clients Version 8.1.0—Installation and User's Guide", (Dec. 2016), 270 pages.

[Part 3 of 3] Grace Period Disclosure: IBM, "IBM Spectrum Protect for Windows Backup-Archive Clients Version 8.1.0—Installation and User's Guide", (Dec. 2016), 270 pages.

Grace Period Disclosure: IBM, "IBM Spectrum Protect for Virtual Environments Version 8.1.0—Data Protection for VMware User's Guide", Second Edition (Feb. 2017), 252 pages.

Declaration under 37 CFR 1.130, for U.S. Appl. No. 15/473,450, by James P. Smith, filed Jul. 27, 2022, 1 page.

Statement Regarding Prior Disclosures By Another Who Obtained The Subject Matter From An Inventor, for U.S. Appl. No. 15/473,450, by Janaki K. Davda, filed Jul. 28, 2022, 1 page, for "IBM Spectrum Protect for Windows Backup-Archive Clients Version 8.1.0—Installation and User's Guide", (Dec. 2016), 1 page.

Statement Regarding Prior Disclosures By Another Who Obtained The Subject Matter From An Inventor, for U.S. Appl. No. 15/473,450, by Janaki K. Davda, filed Jul. 28, 2022, 1 page, for "IBM Spectrum Protect for Virtual Environments Version 8.1.0—Data Protection for VMware User's Guide", Second Edition, (Feb. 2017), 1 page.

* cited by examiner

```
(E) 30.vmName: dc1-ds2-rhel-29gb-4hd
tagdatamover: Yes
tagdefaultdatamover: LKB2BB_DM1A
domainKeyword:
domainSelected: No
scheduleTagName: LKB2BB-DC1-TAG-CLSC-1DM
scheduleTagNameSource: Tag on (Datacenter1) (datacenter-21)
vssSnapAttempts: 2
nonVssSnapAttempts: 0
snapAttemptSource: Node Default
backupManagement: Included
backupMgmSource: Schedule (Spectrum Protect)
managementClassName: STANDARD
managementClassSource: Node Default
dataMoverTagName: LKB2BB_DM1A
dataMoverTagSource: Tag on (Datacenter1) (datacenter-21)
lastBackupRunTime: 07/01/2016 10:52:00
lastBackupStatus: Successful
backupType: Incremental Forever - Incremental
VMDK[1]Label: 'Hard disk 1' (Hard Disk 1)
VMDK[1]Name: '[DC1-datastore2]
dc1-ds2-rhel-29gb-4hd_1/dc1-ds2-rhel-29gb-4hd.vmdk'
VMDK[1]Status: Included
VMDK[2]Label: 'Hard disk 2' (Hard Disk 2)
VMDK[2]Name: '[DC1-datastore2]
dc1-ds2-rhel-29gb-4hd_1/dc1-ds2-rhel-29gb-4hd_1.vmdk'
VMDK[2]Status: Included
VMDK[3]Label: 'Hard disk 3' (Hard Disk 3)
VMDK[3]Name: '[DC1-datastore2]
dc1-ds2-rhel-29gb-4hd_1/dc1-ds2-rhel-29gb-4hd_2.vmdk'
VMDK[3]Status: Included
VMDK[4]Label: 'Hard disk 4' (Hard Disk 4)
VMDK[4]Name: '[DC1-datastore2]
dc1-ds2-rhel-29gb-4hd_1/dc1-ds2-rhel-29gb-4hd_3.vmdk'
VMDK[4]Status: Included
```

FIG. 2

| | | ← 300 |
|---|---|---|
| Schedule Name | KHA-131030-SQUOTE | |
| Schedule Repeats | Hourly | |
| Exclude from Backup | No | System Default |
| Retention Policy | BVT-BACKUP8_MGMT | Cluster1 |
| Retention Period | 30 days or 2 versions | Cluster1 |
| Data Mover | WIN12_CLUSTER_DM | |
| Disk Protection | All disks | System Default |
| Disk Consistency | Machine consistent only | Cluster1 |

FIG. 3

| CATEGORY | TAG | TAG DESCRIPTION |
|---|---|---|
| Backup Management | Excluded | The object is excluded from backups. |
| Backup Management | Included | The object is included in backups. |
| Data Mover | Datamover_name | This is the data mover used for backups. |
| Disk Backup List | Include \| Exclude: virtual disk number, virtual disk number, . . . | The list of virtual disks included or excluded in backups. |
| Management Class | Management_class_name | This is the policy used for retention settings. |
| Schedule | Schedule_name | This is the schedule to use for backups. |
| Snapshot Attempts | Quiesce, non-quiesce | This is the number of quiesced and non-quiesced snapshots to attempt. |
| Application Protection | Enabled | Application protection is provided. |
| Application Protection | Enabled_keep_SQL_log | SQL Server is protected and log files are kept for in-quest log file management. |

EXPLOITING OBJECT TAGS TO PRODUCE A WORK ORDER ACROSS BACKUP ENGINES FOR A BACKUP JOB

FIELD

Embodiments of the invention relate to exploiting object tags (object attributes) in order to produce a work order (manifest) across several backup engines (work units) for a backup job.

BACKGROUND

Today, as Information Technology (IT) organizations aggressively accelerate virtualization using virtual server environments, they face challenges in terms of data protection. Virtual server environments may be described as providing virtualization by allowing multiple virtual machines on shared resources. Each of the virtual machines is allocated portions of the shared resources (e.g., processor use and storage).

Workloads in virtual server environments are usually much bigger than an individual backup engine can manage. Therefore, several backup engines are assigned to handle a workload (e.g., large datacenter may have 1000 virtual machines) to move data from a server to target (backend) storage. A single backup engine is not able to back up all these virtual machines within a given (e.g., 8-10 hour) backup window. Therefore, multiple backup engines are needed.

Virtual server environments are dynamic, and virtual machines are created on a daily basis. Virtual server environments migrate (storage/host) between resources in the infrastructure. Virtual server environments may be geographically distributed. All assets in a virtual server environment may have different work orders (e.g., don't backup test virtual machines, development virtual machines are to be kept longer then production virtual machines, etc.).

In conventional systems, tags, attributes, and notes are used by backup products to control policy and report. However, existing products employ an "outside-in" viewpoint in which, for a policy, job or schedule, inventory is selected using tags, attributes, and/or notes. In addition, backup policy configuration is done via an external interface. Existing backup management solutions control backup policy on the entire virtual machine.

SUMMARY

Provided is a computer program product for exploiting object tags in order to produce a work order across several backup engines for a backup job. The computer program product comprises a computer readable storage medium having program code embodied therewith, the program code executable by at least one processor to perform: receiving selection of tags for an object; creating a work order for the object using the tags; and storing the work order with a virtual server that stores the object, wherein a data mover of a backup engine retrieves the work order from the virtual server to back up the object.

Provided is a computer system for exploiting object tags in order to produce a work order across several backup engines for a backup job. The computer system comprises one or more processors, one or more computer-readable memories and one or more computer-readable, tangible storage devices; and program instructions, stored on at least one of the one or more computer-readable, tangible storage devices for execution by at least one of the one or more processors via at least one of the one or more memories, to perform operations comprising: receiving selection of tags for an object; creating a work order for the object using the tags; and storing the work order with a virtual server that stores the object, wherein a data mover of a backup engine retrieves the work order from the virtual server to back up the object.

Provided is a method for exploiting object tags in order to produce a work order across several backup engines for a backup job. The method comprises: receiving, by a processor of a computer, selection of tags for an object; creating a work order for the object using the tags; and storing the work order with a virtual server that stores the object, wherein a data mover of a backup engine retrieves the work order from the virtual server to back up the object.

BRIEF DESCRIPTION OF THE SEVERAL VIEWS OF THE DRAWINGS

Referring now to the drawings in which like reference numbers represent corresponding parts throughout:

FIG. 2 illustrates a listing of the types of data that backup engines are able to access in accordance with certain embodiments.

FIG. 3 illustrates a screen shot that shows a sample work order for a backup job that backs up all virtual machines that belong to a host in accordance with certain embodiments.

FIG. 4 illustrates a table of tags created in the virtual management system inventory in accordance with certain embodiments.

DETAILED DESCRIPTION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Embodiments provide a solution for more complete and flexible backup management in virtual server environments. Embodiments are conscious of virtual server environment resources (e.g., a virtual management system, network, etc.) and how they are being used (e.g., sessions to the virtual management system, host, datastore, etc.). Embodiments take into account concepts of locality (e.g., where is the backup engine relative to the work load) since virtual server environments are geographically distributed. Embodiments understand additional data pathways between elements in virtual environments to enable specific performance optimization. With embodiments, between the virtual management system's data protection framework and virtual disks inside virtual machines, some transports work better with different workloads (e.g., a direct connection to storage works better for full backups, but has overhead which constrains it on smaller workloads like incremental backup). Embodiments allow solutions focused on virtual disks inside virtual machines (e.g., exclude C: drive or DISK 1 on VirtualMachine 1 only, not on entire job). Embodiments make the decision to optimize backup, scale up or even scale down.

Figure 1:
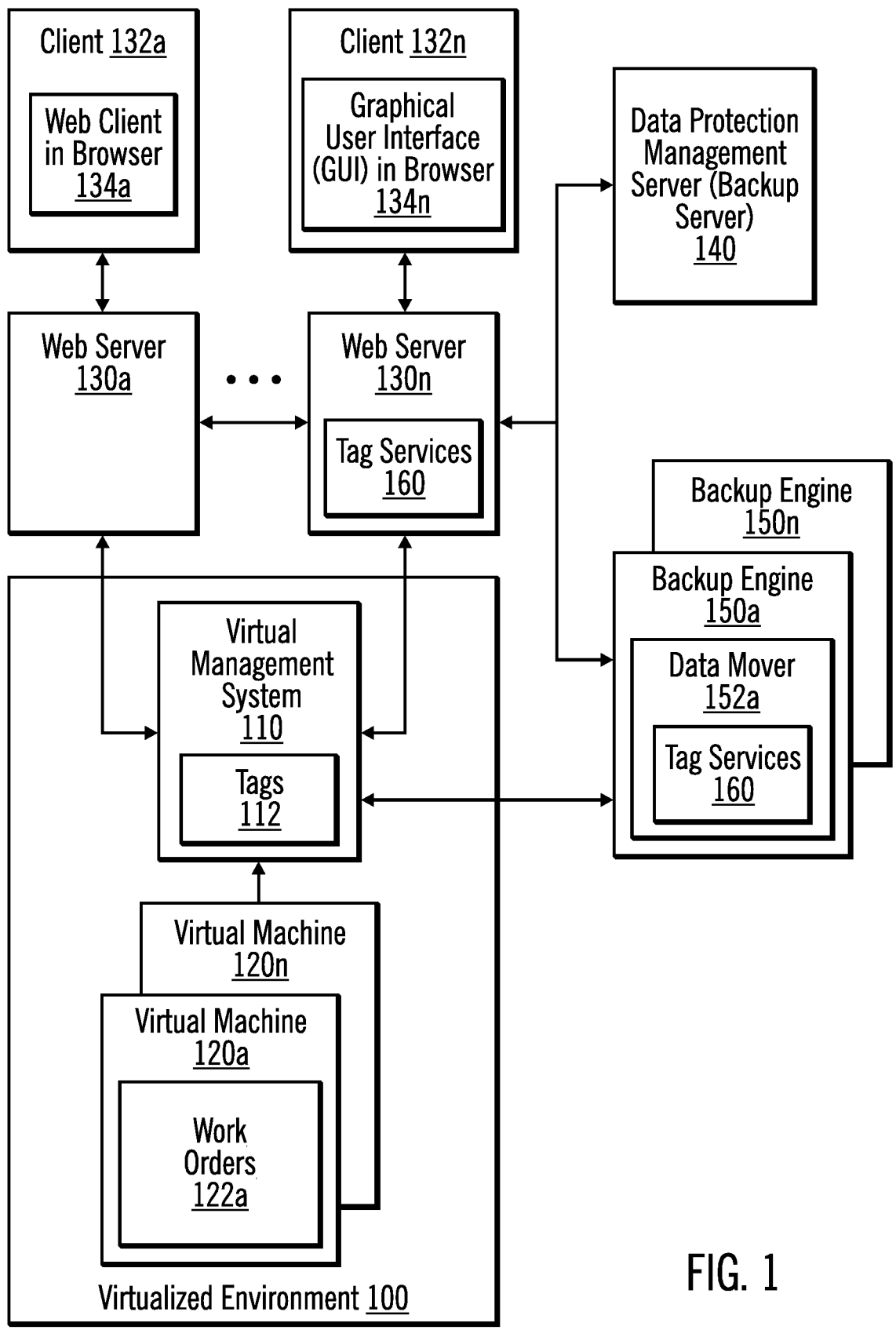
FIG. 1 illustrates, in a block diagram, a computing environment in accordance with certain embodiments.

FIG. 1 illustrates, in a block diagram, a computing environment in accordance with certain embodiments. A virtualized environment 100 includes a virtual management system 110 that is coupled to virtual machines 120a . . . 120n. The virtual management system 110 stores tags 112 for objects. An object may be a virtual machine, a virtual machine folder, a host folder, a resource pool, a host, a cluster, and a datacenter. The tags for an object form a work order (which may also be referred to as a "data protection policy"). The work orders are stored at the virtual machines 120a . . . 120n (e.g., work order 122a is stored at virtual machine 120a). Each of the virtual machines 120 has a portion of a processor (Central Processing Unit (CPU)) one or more virtual disks (which is a logical component of the virtual machine and is a slice of storage for that virtual machine). The virtual management system 110 is also coupled to web servers 130a . . . 130n. The web servers 130a . . . 130n are coupled to each other.

Each of the web servers 130a . . . 130n is coupled to a client 132a . . . 132n. For example, web server 130a is coupled to client 132a, which includes a web client in a browser 134a, while web server 130n is coupled to web client 132n, which includes a Graphical User Interface (GUI) in a browser 134n.

A data protection management server 140 and backup engines 150a . . . 150n are coupled to the web server 130n. Each of the backup engines 150a . . . 150n includes a data mover. For example, backup engine 150a includes data mover 152a.

A shared component, the tag services 160, is created to communicate with the virtualized environment 100 to handle tag creation, deletion, and query. The tag services 160 may be deployed in a web server 130b and/or the data movers. The tag services 160 may be referred to as common tag services.

With embodiments, the tags may be created and modified using a browser, such as the GUI in the browser 134n. The tags are used to define work orders. Also, the tags may be used for inheritance of the tags and load balancing. Embodiments provide tags for categories that indicate how to backup virtual machines.

Container objects include: datacenters, virtual machine folders, host folders, resource pools, clusters, and hosts. Other objects (which are not container objects) include: virtual machines.

The virtual infrastructure includes categories, inventory objects, etc. The data protection infrastructure includes backup schedules, resource schedules, backup status, etc. As part of the data protection infrastructure, the backup engines have access to information, such as type of backup (full, incremental, etc.), backup status (such as at-risk status, last backup time, etc.).

With embodiments, an inventory is a collection of virtual and physical objects managed by the virtualized environment 100. Examples of inventory objects include: virtual machine, virtual machine folder, host folder, resource pool, host, cluster, and datacenter.

With the addition of the tag services, the backup engines have full access to inventory tags (i.e., tags of inventory objects) and inventory hierarchy in the virtualized environment 100. Embodiments allow the backup engines to access all data in both the virtual infrastructure and the data protection infrastructure.

FIG. 2 illustrates a listing 200 of the types of data that backup engines are able to access in accordance with certain embodiments. The types of data include: 1) the name of a backup schedule (scheduleTagName) and the source of that backup schedule (scheduleTagNameSource), 2) backup management information (backupManagement) and the source of that backup management information (backupMgmSource), 3) a management class (managementClassName) and the source of that management class (managementClassSource), and 4) data mover (dataMoverTagName) and source of the data mover (dataMoverTagNameSource).

FIG. 3 illustrates a table 300 that shows a sample work order for a backup job that backs up all virtual machines that belong to a host in accordance with certain embodiments. The table 300 shows a list of elements that are configured as part of a backup policy. Each element is mapped to a unique tag in a category created as part of the virtual management system inventory. The schedule name indicates the schedule to use for backups. The retention policy and the retention period are inherited retention settings. With embodiments, the values in the first column of table 300 map to categories, the second column contains tags, and the value in the third column indicates from which container object the tag is inherited. If there is no value in the third column, then the tag is located on the local object (i.e., not inherited). Also, although one data mover is specified in the work order of FIG. 3, multiple data movers may be specified to produce the work order across several backup engines for the backup job.

With embodiments, associating tags with a target inventory object (the inventory object that contains virtual machines to be backed up) may be done in the following two ways:

a) Tags are set locally on the target object. In this example, the schedule name, backup engines, and disk protection tags are set in the target object.

b) Tags are set in an object that is a parent of the target object. In this example, a retention policy/retention period tag is set in a datacenter. Because the host belongs to this datacenter, the host inherits the retention policy/retention period setting from the datacenter. Similarly, the host inherits the data consistency setting from a parent host cluster.

FIG. 4 illustrates a table 400 of tags created in the virtual management system 110 inventory in accordance with certain embodiments. With embodiments, each object may be associated with a subset of these tags. With embodiments, the tags may be modified or new tags may be created by, for example, a virtualization administrator. Table 400 has columns for: category (backup management category), tag, and tag description. Table 400 provides, for each category value and tag value, a description of the tag value for that category value. In table 400, the categories include: backup management, data mover, disk backup list, management class, schedule, snapshot attempts, and application protection. With embodiments, a data mover is at a backup engine, and a tag specifying the data mover also specifies the backup engine at which the data mover resides.

The values in the first column of table 300 map to the categories of table 400 as follows:

Schedule Name and Schedule Repeats→map to Category "Schedule"

Excluded from Backup→map to Category "Backup Management"

Retention Policy and Retention Period→map to Category "Management Class"

Data Mover→map to Category "Data Mover"

Disk Protection→map to Category "Disk Backup List"

Disk Consistency→map to Category "Application Protection"

Although not shown in the example of FIG. 3, table 300 could also include values in the first column that map to categories of "Backup Management", "Snapshot Attempts", and "Application Protection".

Figure 5:
FIG. 5 illustrates a table of inheritance rules in accordance with certain embodiments.

FIG. 5 illustrates a table 500 of inheritance rules in accordance with certain embodiments. With embodiments, the inheritance rules may be modified or new inheritance rules may be created by, for example, a virtualization administrator. Table 500 has columns for: target object and order of precedence of tags processed. The possible target objects are: virtual machine, virtual machine folder, host folder, resource pool, host, cluster, and datacenter. The order of precedence of tags processed provides how inheritance is processed for each type of target object.

With embodiments, every time a tag is set or changed in a container object, the tag services propagates any changes marked as inheritable to all objects in the container object. With embodiments, the concept of inheritance across all inventory objects may not be supported. Inventory objects may be divided into two navigation views: "virtual machines and templates" and "hosts and templates". Embodiments contain a definition of inheritance for each of the objects. In addition, for virtual machines that belong to multiple objects and nested objects (such as resource pools and folders), embodiments define a consistent order of precedence to apply inheritance rules. A nested object may be described as one that is below another object in a hierarchy.

Since virtual server environments are dynamic, embodiments query the virtual management system 110 to get the most recent inventory structure and tags before running each backup job. An example of a backup job may be: backup all virtual machines in a virtual machine folder. These virtual machines are referred to as target objects. Also, objects, such as the virtual machine folder object, are referred to as container objects. Building a complete inventory view with all containers and virtual machines in a datacenter may be straight forward, yet costly with existing techniques.

Thus, embodiments perform the following for each category (such as those illustrated in FIG. 4):

1) Pick a category and retrieve all objects with local tags in that category.

2) Create a hash map for this category. This hash map contains the tagged container object and all target objects that may possibly inherit the tag from the container. For container objects that have nested structure, such as folders and resource pools, the hash map contains all target objects (such as folders) and all possible nested containers of its kind (such as all nested sub-folders).

3) Walk through the hash map in the order defined by the order of inheritance (illustrated in FIG.

4) to determine which tag should be applied to the target object (in this example, the target object is a virtual machine).

Embodiments both propagate tags to virtual machines and enable backup engines to use tags for load balancing. First, virtualization administrators size the overall workload and determine the total number of backup engines needed for each schedule. The tag services then automatically assigns backup engines to backup virtual machines according to work load (based on Changed Block Tracking (CBT) or size of virtual machine). CBT indicates which data blocks have changed and need to be backed up. The size of the virtual machine indicates how much data is to be moved. The result of load balancing is that each virtual machine is assigned to one of the backup engines (tagged with one backup engine node name).

Figure 6:
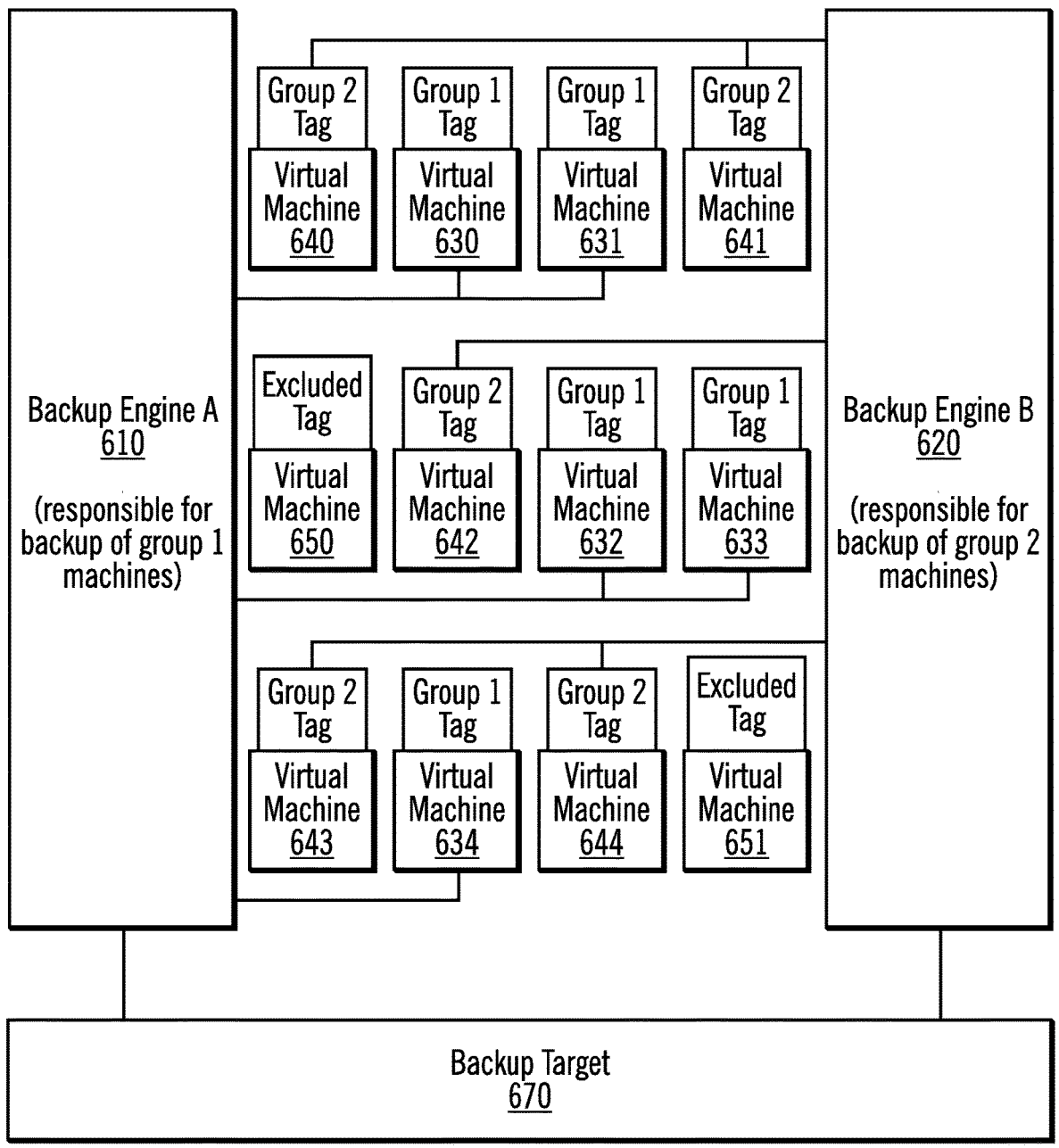
FIG. 6 illustrates an example of work load balancing between two backup engines in accordance with certain embodiments.

FIG. 6 illustrates an example of work load balancing between two backup engines in accordance with certain embodiments. In FIG. 6, backup engine A 610 and backup engine B 620 backup the 12 virtual machines to the backup target 670.

In FIG. 6, each of the 12 virtual machines is tagged. Virtual machines 630-634 are tagged as "group 1", while virtual machines 640-644 are tagged as "group 2". Virtual machines 650-651 are tagged as "excluded" (i.e., excluded from backup), and so these virtual machines are not backed up. Backup engine A 610 is assigned to back up the virtual machines 630-634 tagged as "group 1", while backup engine A 620 is assigned to back up the virtual machines 640-644 tagged as "group 2". When backup engine A 610 receives a scheduled task, it backs up virtual machines that are tagged with the "group 1". Similarly, when backup engine B 620 engine receives a scheduled task, it backs up virtual machines tagged with "group 2".

The work order is stored with the virtual machines. This simplifies management as the backup engines require less configuration. The configuration indicates how a backup job is to be executed by a backup engine. With embodiments, virtualization administrators assign tags based on the object.

Figure 7:
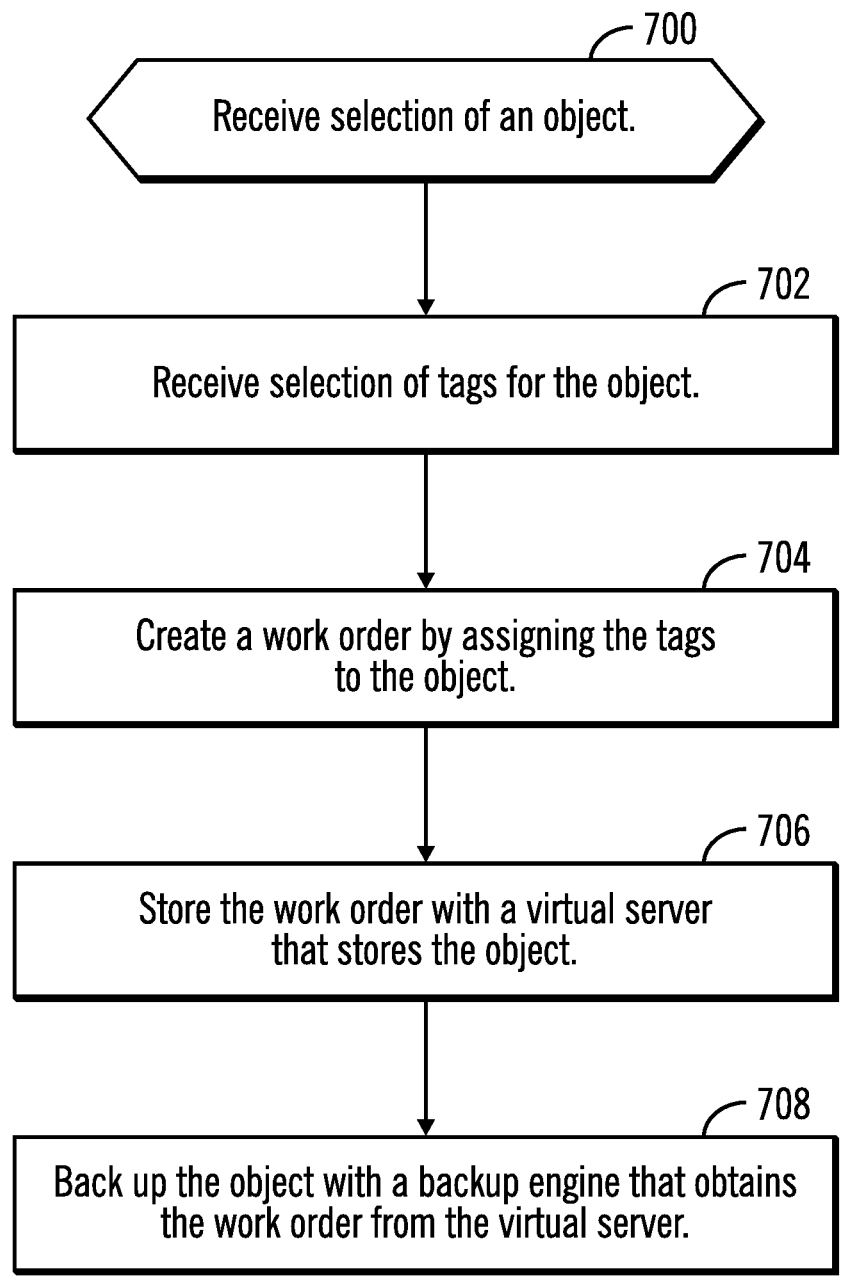
FIG. 7 illustrates, in a flowchart, operations for assigning tags in accordance with certain embodiments.

FIG. 7 illustrates, in a flowchart, operations for assigning tags in accordance with certain embodiments. Control begins at block 700 with the virtual management system 110 receiving selection of an object (i.e., a virtual machine, a virtual machine folder, a host folder, a resource pool, a host, a cluster, and a datacenter). In block 702, the virtual management system 110 receives selection of tags for the object. In block 704, the virtual management system 110 creates a work order by assigning the tags to the object. In block 706, the virtual management system 110 stores the work order with a virtual machine that stores the object. In block 708, the object is backed up with a backup engine that obtains the work order from the virtual server (as the backup engine is backing up that virtual server). In certain embodiments, the work order may identify multiple data movers for the backup job. In such a case, multiple data movers of backup engines obtain the work order from the virtual server and backup the object.

Figure 8:
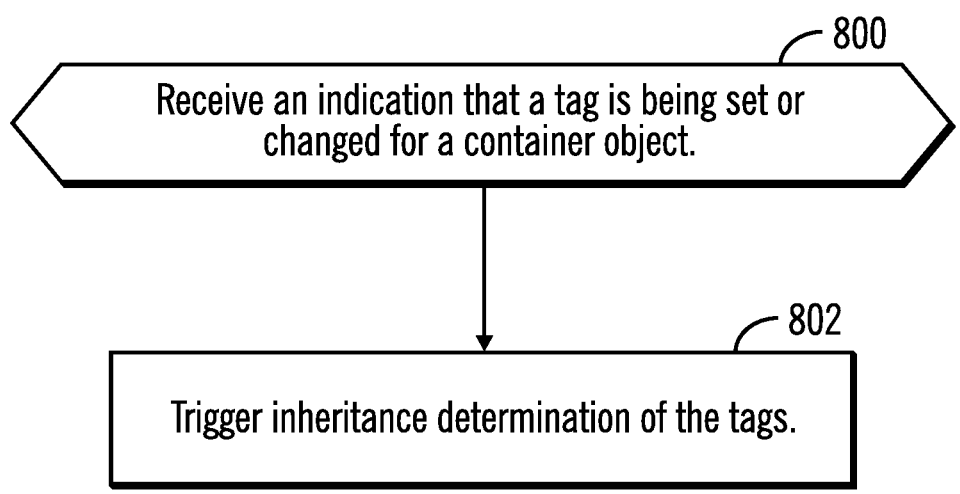
FIG. 8 illustrates, in a flowchart, operations for inheritance in accordance with certain embodiments.

FIG. 8 illustrates, in a flowchart, operations for inheritance in accordance with certain embodiments. Control begins at block 800 with the virtual management system 110 receiving an indication that a tag is being set or changed for a container object. In block 802, the virtual management system 110 triggers inheritance determination of the tags.

That is, the virtual management system 110 uses the table 500 of inheritance rules to determine inheritance for the container object.

Figure 9:
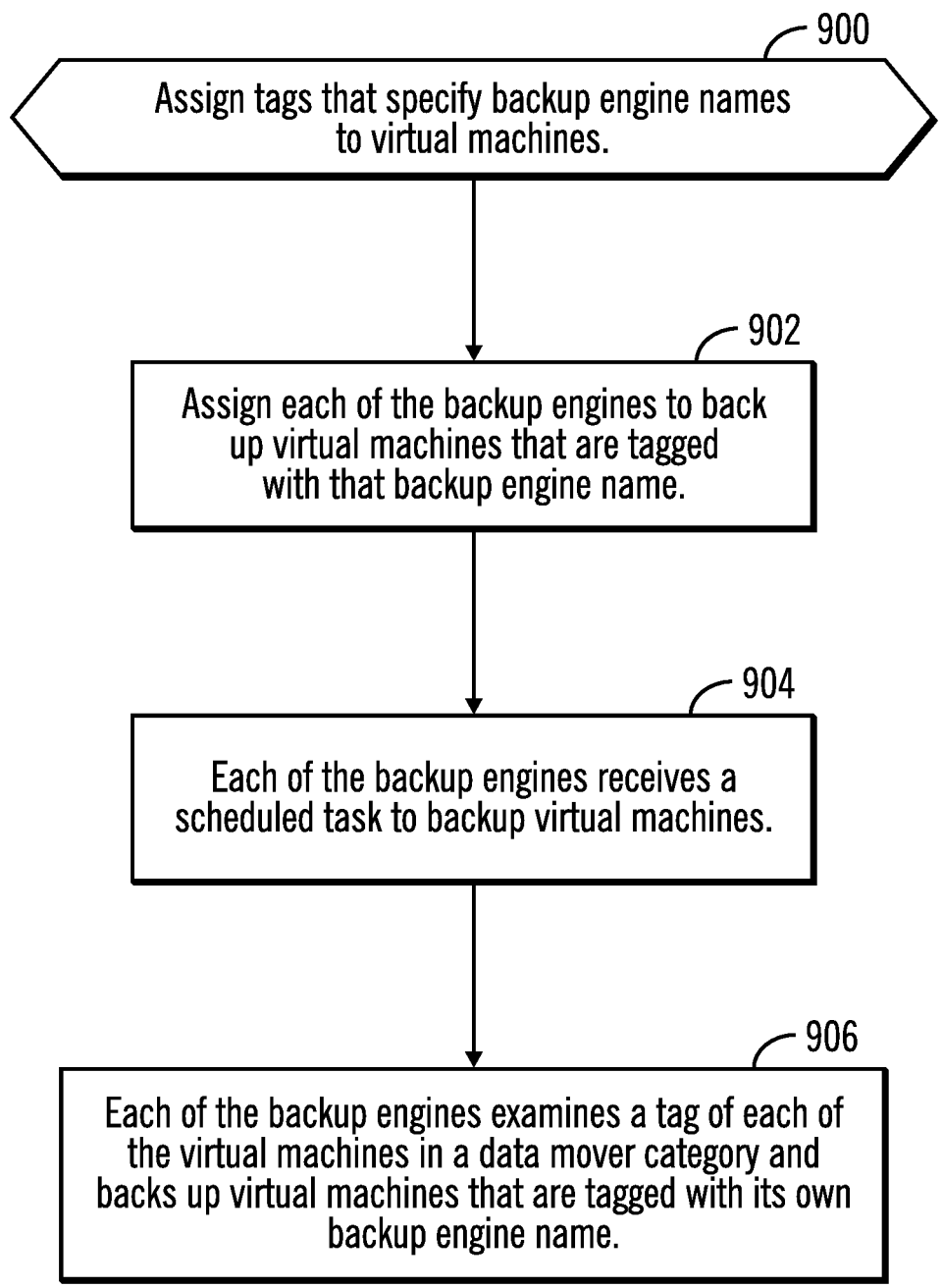
FIG. 9 illustrates, in a flowchart, operations for load balancing in accordance with certain embodiments.

FIG. 9 illustrates, in a flowchart, operations for load balancing in accordance with certain embodiments. Control begins at block 900 with the virtual management system 110 assigning tags that specify backup engine names to virtual machines (e.g., in response to input from a virtualization administrator). In block 902, the tag services 160 assign each of the backup engines to back up virtual machines that are tagged with that backup engine name. In block 904, each of the backup engines receives a scheduled task to backup one or more virtual machines. In block 906, each of the backup engines examines a tag of each of the virtual machines in a data mover category and backs up virtual machines that are tagged with its own backup engine name.

Embodiments provide more complete and flexible backup policy configuration. Defining work orders using the tags centralizes the configuration of the backup job. The configuration is associated with the virtual machine and not kept in some other location. This minimizes the need for reconfiguration when virtual machines are moved to another container.

Defining tag inheritance hierarchy and order of precedence provides the ability to account for global (via inheritance) or local work order definitions.

Work orders consist of several elements that are defined with the tags illustrated in FIG. 4: backup/don't backup, keep for certain number of days (e.g., retention settings), protect applications, include/exclude certain disks, etc. In addition, each virtual machine may have a different combination of elements to have a unique policy. In alternative embodiments, popular sets of combinations may be generalized into management constructs or levels of service, e.g., gold/silver/bronze.

Embodiments provide backup load balancing and prioritization across a pool of backup engines that can dynamically analyze a workload before each backup operation. By integrating with virtual infrastructure, with access to tags, embodiments provide load balancing (i.e., even distribution based on workload). For example, the backup may be optimized based on size of data transfer (can use Changed Block Tracking (CBT) to determine how much data has changed and balance the workload based on this CBT). Also, embodiments may prioritize based on full or incremental backup (e.g., do full backups first, do incremental backups first, etc.) and based on CBT.

Embodiments provide backup prioritization based on risk factors. In particular, embodiments prioritize based on at-risk status (e.g., virtual machines at risk would be attempted first). A virtual machine that has not been backed up for a long period of time (e.g., several days) may be flagged as at risk. With embodiments, there may be an at risk policy that defines when a virtual machine should be flagged as at risk.

Embodiments provide backup optimization based on locality. For backup optimization based on locality, the backup engine is matched to one or more virtual machines on a same host cluster, and the backup engines are matched within the virtual management system. If there is a case for a host/cluster that spans multiple locations (A and B) and there are two backup engines (one in A and one in B), it is possible to assign the appropriate backup engine based on locality. Backup optimization may be based on locality of a data protection management server, such that a virtual machine physically hosted in site 1 goes to the data protection management server 1, while the virtual machine physical hosted in site 2 goes to the data protection management server 2, with bidirectional replication between the data protection management servers so that the virtual machines are available for restore in either location (again depending on locality).

Embodiments provide high-availability of backup engines. High-availability may determine whether one of the backup engines is not functioning properly (e.g., is "dead") and cannot be used for an operation, may test services, protocols, paths, ports, etc. to ensure that a backup engine is able to function. If the backup engine is not able to function, embodiments distribute work load over the remaining backup engines.

Embodiments provide automatic provisioning of backup engines. A pool of backup engines may dynamically shrink based on achieving steady state. For example, initially, if six backup engines are assigned to a pool, there may be a policy that says when 95% of virtual machines are performing incremental backups, then switch to assigning 2 backup engines and "release" the other 4 backup engines. This may include removing definitions on the data protection management server, uninstalling the backup engine, and deleting a virtual machine from the virtual management system inventory. The pool may dynamically grow by adding a backup engine. For example, initially, if six backup engines are assigned to a pool, there may be a policy that says when 20% of virtual machines are not backed up or at risk, then deploy and configure a number of additional backup engines. For example, there may be a folder where such virtual machines are stored. Embodiments understand how to create virtual machines, understand how to deploy a virtual appliance on a virtual machine, and understanding how to customize virtual machines with a pre-canned backup policy configuration.

Embodiments perform storage management and data backup operations in virtual server environments. Embodiments create tags for specific behaviors within or between components of the virtual environment, manage the tags such that changes to state of the tags are "inheritable", and perform load-balancing between the components to increase and/or maximize the system performance of the virtual environment.

Embodiments handle backup policy configuration and target the entire inventory hierarchy in the virtual environment. The inventory hierarchy includes all object types, for example, datacenters, folders, hosts, host clusters, folders, resource pools, and virtual machines. Embodiments define multiple tags to configure different backup parameters. Each tag may be associated with any inventory object. Tag values may be inherited.

Figure 10:
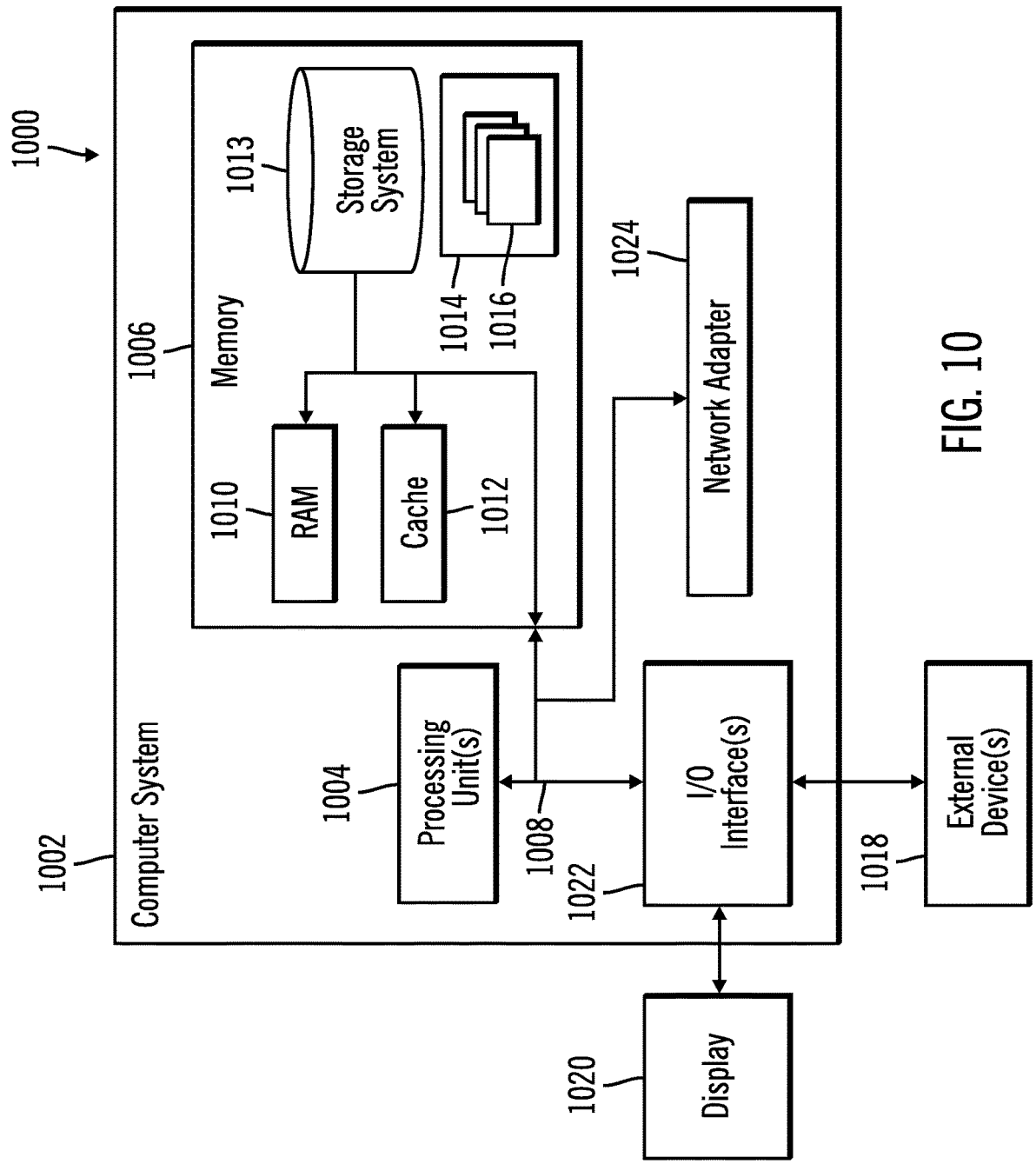
FIG. 10 illustrates a computing architecture in which the components of FIG. 1 may be implemented in accordance with certain embodiments.

FIG. 10 illustrates a computing architecture in which the components of FIG. 1 may be implemented in accordance with certain embodiments. In certain embodiments, the virtualized environment 100, the web servers 130*a* . . . 130*n*, the clients 132*a* . . . 13*sn*, the data protection management server 140, and the backup engines 150*a* . . . 150*n* may implement computer architecture 1000.

Computer system/server 1002 may be described in the general context of computer system executable instructions, such as program modules, being executed by a computer system. Generally, program modules may include routines, programs, objects, components, logic, data structures, and so on that perform particular tasks or implement particular abstract data types. Computer system/server 1002 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 10, the computer system/server 1002 is shown in the form of a general-purpose computing device. The components of computer system/server 1002 may include, but are not limited to, one or more processors or processing units 1004, a system memory 1006, and a bus 1008 that couples various system components including system memory 1006 to processor 1004. Bus 1008 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 1002 typically includes a variety of computer system readable media. Such media may be any available media that is accessible by computer system/server 1002, and it includes both volatile and non-volatile media, removable and non-removable media.

System memory 1006 can include computer system readable media in the form of volatile memory, such as random access memory (RAM) 1011 and/or cache memory 1012. Computer system/server 1002 may further include other removable/non-removable, volatile/non-volatile computer system storage media. By way of example only, storage system 1013 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1008 by one or more data media interfaces. As will be further depicted and described below, memory 1006 may include at least one program product having a set (e.g., at least one) of program modules that are configured to carry out the functions of embodiments of the invention.

Program/utility 1014, having a set (at least one) of program modules 1016, may be stored in memory 1006 by way of example, and not limitation, as well as an operating system, one or more application programs, other program modules, and program data. Each of the operating system, one or more application programs, other program modules, and program data or some combination thereof, may include an implementation of a networking environment. The components of the computer 1002 may be implemented as program modules 1016 which generally carry out the functions and/or methodologies of embodiments of the invention as described herein. The systems of FIG. 1 may be implemented in one or more computer systems 1002, where, if they are implemented in multiple computer systems 1002, then the computer systems may communicate over a network.

Computer system/server 1002 may also communicate with one or more external devices 1018 such as a keyboard, a pointing device, a display 1020, etc.; one or more devices that enable a user to interact with computer system/server 1002; and/or any devices (e.g., network card, modem, etc.) that enable computer system/server 1002 to communicate with one or more other computing devices. Such communication can occur via Input/Output (I/O) interfaces 1022.

Still yet, computer system/server 1002 can communicate with one or more networks such as a local area network (LAN), a general wide area network (WAN), and/or a public network (e.g., the Internet) via network adapter 1024. As depicted, network adapter 1024 communicates with the other components of computer system/server 1002 via bus 1008. It should be understood that although not shown, other hardware and/or software components could be used in conjunction with computer system/server 1002. Examples, include, but are not limited to: microcode, device drivers, redundant processing units, external disk drive arrays, RAID systems, tape drives, and data archival storage systems, etc.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

Cloud Embodiments

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 11:
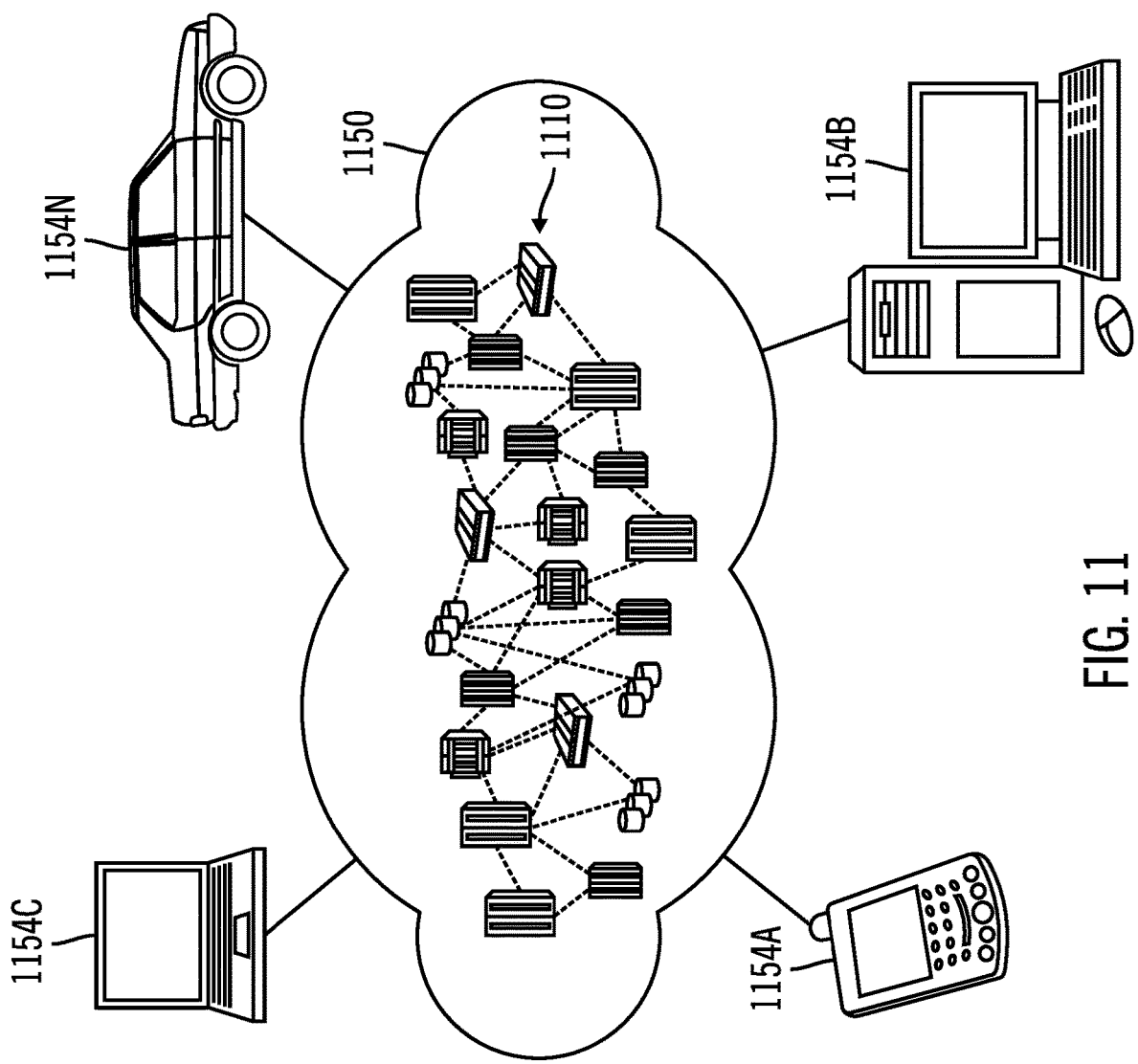
FIG. 11 illustrates a cloud computing environment in accordance with certain embodiments.

Referring now to FIG. 11, illustrative cloud computing environment 1150 is depicted. As shown, cloud computing environment 1150 includes one or more cloud computing nodes 1110 with which local computing devices used by cloud consumers, such as, for example, personal digital assistant (PDA) or cellular telephone 1154A, desktop computer 1154B, laptop computer 1154C, and/or automobile computer system 1154N may communicate. Nodes 1110 may communicate with one another. They may be grouped (not shown) physically or virtually, in one or more networks, such as Private, Community, Public, or Hybrid clouds as described hereinabove, or a combination thereof. This allows cloud computing environment 1150 to offer infrastructure, platforms and/or software as services for which a cloud consumer does not need to maintain resources on a local computing device. It is understood that the types of computing devices 1154A-N shown in FIG. 11 are intended to be illustrative only and that computing nodes 1110 and cloud computing environment 1150 can communicate with any type of computerized device over any type of network and/or network addressable connection (e.g., using a web browser).

Figure 12:
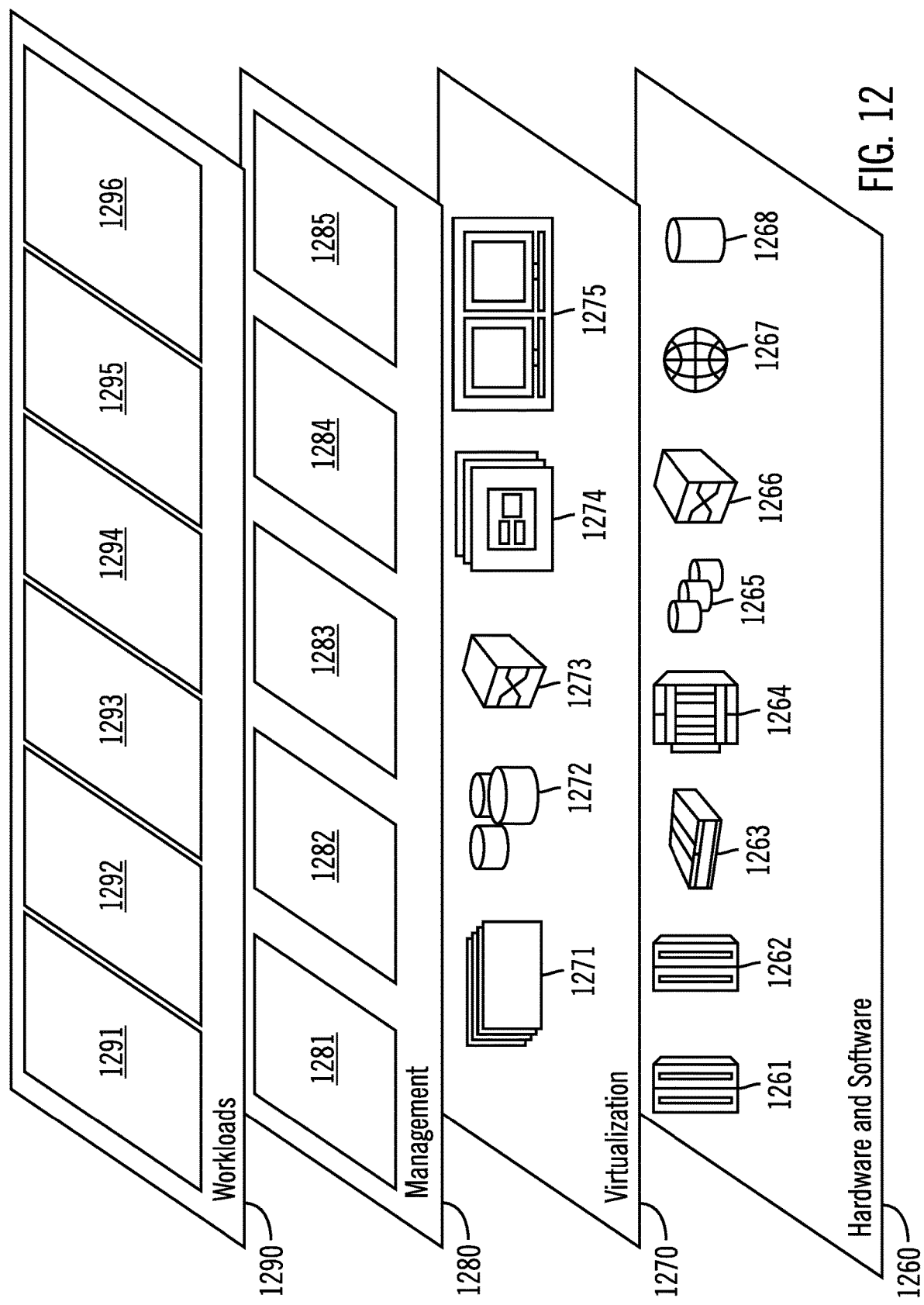
FIG. 12 illustrates abstraction model layers in accordance with certain embodiments.

Referring now to FIG. 12, a set of functional abstraction layers provided by cloud computing environment 1150 (FIG. 11) is shown. It should be understood in advance that the components, layers, and functions shown in FIG. 12 are intended to be illustrative only and embodiments of the invention are not limited thereto. As depicted, the following layers and corresponding functions are provided:

Hardware and software layer 1260 includes hardware and software components. Examples of hardware components include: mainframes 1261; RISC (Reduced Instruction Set Computer) architecture based servers 1262; servers 1263; blade servers 1264; storage devices 1265; and networks and networking components 1266. In some embodiments, software components include network application server software 1267 and database software 1268.

Virtualization layer 1270 provides an abstraction layer from which the following examples of virtual entities may be provided: virtual servers 1271; virtual storage 1272; virtual networks 1273, including virtual private networks; virtual applications and operating systems 1274; and virtual clients 1275.

In one example, management layer 1280 may provide the functions described below. Resource provisioning 1281 provides dynamic procurement of computing resources and other resources that are utilized to perform tasks within the cloud computing environment. Metering and Pricing 1282 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1283 provides access to the cloud computing environment for consumers and system administrators. Service level management 1284 provides cloud computing resource allocation and management such that required service levels are met. Service Level Agreement (SLA) planning and fulfillment 1285 provide pre-arrangement for, and procurement of, cloud computing resources for which a future requirement is anticipated in accordance with an SLA.

Workloads layer 1290 provides examples of functionality for which the cloud computing environment may be utilized. Examples of workloads and functions which may be provided from this layer include: mapping and navigation 1291; software development and lifecycle management 1292; virtual classroom education delivery 1293; data analytics processing 1294; transaction processing 1295; and to exploit object tags in order to produce a work order across several backup engines (work units) for a backup job.

Thus, in certain embodiments, software or a program, implementing exploiting object tags in order to produce a work order across several backup engines (work units) for a backup job in accordance with embodiments described herein, is provided as a service in a cloud infrastructure.

In certain embodiments, the components of FIG. 1 are part of a cloud infrastructure. In other embodiments, the components of FIG. 1 are not part of a cloud infrastructure.

Additional Embodiment Details

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer program product, the computer program product comprising a computer readable storage medium having program code embodied therewith, the program code executable by at least one processor to perform:
   in a virtualized environment that comprises a virtual management system coupled to a plurality of virtual machines, wherein the virtual management system is coupled to a plurality of backup engines external to the virtualized environment, wherein the virtual management system stores a plurality of tags created by tag services at a data mover of each backup engine of the plurality of backup engines,
   for a first virtual machine of the plurality of virtual machines,
      creating a first work order for a first object using first tags of the tags stored at the virtual management system; and
      in response to creating the first work order, storing the first work order on the first virtual machine that stores the first object; and
   for a second virtual machine of the plurality of virtual machines,
      creating a second work order for a second object using second tags of the tags stored at the virtual management system; and
      in response to creating the second work order, storing the second work order on the second virtual machine that stores the second object; and
   performing backups with load balancing and a prioritization option selected from a group of options comprising: an option based on a size of a data transfer, an option based on incremental backups and full backups, an option based on at-risk status of the first virtual machine and the second virtual machine, and an option based on locality.

2. The computer program product of claim 1, wherein the first object is one of a virtual machine folder, a host folder, a resource pool, a host, a cluster, and a datacenter.

3. The computer program product of claim 1, wherein the plurality of tags are associated with categories including backup management, data mover, disk backup list, management class, schedule, snapshot attempts, and application protection.

4. The computer program product of claim 1, wherein the program code is executable by the at least one processor to perform:
   in response to receiving an indication that a tag of the first tags is being set or changed for any container object, triggering determination of inheritance of the first tags.

5. The computer program product of claim 1, wherein the virtual management system, the plurality of virtual machines, web servers, clients, a data protection management server, and the plurality of backup engines are nodes in a cloud infrastructure.

6. The computer program product of claim 1, wherein a Software as a Service (SaaS) is configured to perform computer program product operations.

7. The computer program product of claim 1, wherein the program code is executable by the at least one processor to perform:
   provisioning the plurality of backup engines by:
      in response to determining that a first number of the virtual machines of the plurality of virtual machines are performing incremental backups, reducing a number of backup engines in the plurality of backup engines; and
      in response to determining that a second number of the virtual machines of the plurality of virtual machines are not backed up, increasing the number of backup engines in the plurality of backup engines.

8. A computer system, comprising:
   one or more processors, one or more computer-readable memories and one or more computer-readable, tangible storage devices; and
   program instructions, stored on at least one of the one or more computer-readable, tangible storage devices for execution by at least one of the one or more processors via at least one of the one or more computer-readable memories, to perform operations comprising:
   in a virtualized environment that comprises a virtual management system coupled to a plurality of virtual machines, wherein the virtual management system is coupled to a plurality of backup engines external to the virtualized environment, wherein the virtual management system stores a plurality of tags created by tag services at a data mover of each backup engine of the plurality of backup engines,
   for a first virtual machine of the plurality of virtual machines,
      creating a first work order for a first object using first tags of the tags stored at the virtual management system; and
      in response to creating the first work order, storing the first work order on the first virtual machine that stores the first object;

for a second virtual machine of the plurality of virtual machines,
    creating a second work order for a second object using second tags of the tags stored at the virtual management system; and
    in response to creating the second work order, storing the second work order on the second virtual machine that stores the second object; and
performing backups with load balancing and a prioritization option selected from a group of options comprising: an option based on a size of a data transfer, an option based on incremental backups and full backups, an option based on at-risk status of the first virtual machine and the second virtual machine, and an option based on locality.

9. The computer system of claim 8, wherein the first object is one of a virtual machine folder, a host folder, a resource pool, a host, a cluster, and a datacenter.

10. The computer system of claim 8, wherein the plurality of tags are associated with categories including backup management, data mover, disk backup list, management class, schedule, snapshot attempts, and application protection.

11. The computer system of claim 8, wherein the operations further comprise:
    in response to receiving an indication that a tag of the first tags is being set or changed for any container object, triggering determination of inheritance of the first tags.

12. The computer system of claim 8, wherein the virtual management system, the plurality of virtual machines, web servers, clients, a data protection management server, and the plurality of backup engines are nodes in a cloud infrastructure.

13. The computer system of claim 8, wherein a Software as a Service (SaaS) is configured to perform computer system operations.

14. The computer system of claim 8, wherein the operations further comprise:
    provisioning the plurality of backup engines by:
        in response to determining that a first number of the virtual machines of the plurality of virtual machines are performing incremental backups, reducing a number of backup engines in the plurality of backup engines; and
        in response to determining that a second number of the virtual machines of the plurality of virtual machines are not backed up, increasing the number of backup engines in the plurality of backup engines.

15. A computer-implemented method, comprising:
in a virtualized environment that comprises a virtual management system coupled to a plurality of virtual machines, wherein the virtual management system is coupled to a plurality of backup engines external to the virtualized environment, wherein the virtual management system stores a plurality of tags created by tag services at a data mover of each backup engine of the plurality of backup engines,
for a first virtual machine of the plurality of virtual machines,
    creating a first work order for a first object using first tags of the tags stored at the virtual management system; and
    in response to creating the first work order, storing the first work order on the first virtual machine that stores the first object;
for a second virtual machine of the plurality of virtual machines,
    creating a second work order for a second object using second tags of the tags stored at the virtual management system; and
    in response to creating the second work order, storing the second work order on the second virtual machine that stores the second object; and
    performing backups with load balancing and a prioritization option selected from a group of options comprising: an option based on a size of a data transfer, an option based on incremental backups and full backups, an option based on at-risk status of the first virtual machine and the second virtual machine, and an option based on locality.

16. The computer-implemented method of claim 15, wherein the first object is one of a virtual machine folder, a host folder, a resource pool, a host, a cluster, and a datacenter.

17. The computer-implemented method of claim 15, wherein the plurality of tags are associated with categories including backup management, data mover, disk backup list, management class, schedule, snapshot attempts, and application protection.

18. The computer-implemented method of claim 15, further comprising:
    in response to receiving an indication that a tag of the first tags is being set or changed for any container object, triggering determination of inheritance of the first tags.

19. The computer-implemented method of claim 15, wherein the virtual management system, the plurality of virtual machines, web servers, clients, a data protection management server, and the plurality of backup engines are nodes in a cloud infrastructure.

20. The computer-implemented method of claim 15, further comprising:
    provisioning the plurality of backup engines by:
        in response to determining that a first number of the virtual machines of the plurality of virtual machines are performing incremental backups, reducing a number of backup engines in the plurality of backup engines; and
        in response to determining that a second number of the virtual machines of the plurality of virtual machines are not backed up, increasing the number of backup engines in the plurality of backup engines.

* * * * *